(12) United States Patent
Jayamon et al.

(10) Patent No.: US 12,230,893 B2
(45) Date of Patent: Feb. 18, 2025

(54) PARTIALLY-CONNECTED PHASE PROGRESSION MATRIXES

(71) Applicant: QUALCOMM Incorporated, San Diego, CA (US)

(72) Inventors: Jefy Alex Jayamon, San Diego, CA (US); Jeremy Darren Dunworth, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 17/877,972

(22) Filed: Jul. 31, 2022

(65) Prior Publication Data

US 2024/0039155 A1  Feb. 1, 2024

(51) Int. Cl.
*H01Q 3/40*  (2006.01)

(52) U.S. Cl.
CPC ..................... *H01Q 3/40* (2013.01)

(58) Field of Classification Search
CPC ....................................................... H01Q 3/40
USPC ........................................................ 342/371
See application file for complete search history.

(56) References Cited

U.S. PATENT DOCUMENTS

| | | | |
|---|---|---|---|
| 6,218,987 B1 | 4/2001 | Derneryd et al. | |
| 10,243,412 B1 * | 3/2019 | Fink | H04B 7/0456 |
| 11,089,595 B1 | 8/2021 | Frigon et al. | |
| 2004/0174299 A1 | 9/2004 | Casas et al. | |

FOREIGN PATENT DOCUMENTS

| | | | | |
|---|---|---|---|---|
| AU | 2020202343 B2 | * | 5/2021 | ............ H04B 7/0404 |
| CN | 111740767 A | * | 10/2020 | |

OTHER PUBLICATIONS

Cetinoneri B., et al., "An 8×8 Butler Matrix in 0.13-um CMOS for 5-6-GHz Multibeam Applications", IEEE Transactions on Microwave Theory and Techniques, vol. 59, No. 2, Feb. 1, 2011, pp. 295-301, XP055740221, USA ISSN: 0018-9480, DOI: 10.1109/TMTT.2010.2097751, figure 1.
International Search Report and Written Opinion—PCT/US2023/026999—ISA/EPO—Oct. 17, 2023.

* cited by examiner

*Primary Examiner* — Harry K Liu
(74) *Attorney, Agent, or Firm* — SUNSTEIN LLP/Qualcomm Incorporated

(57) ABSTRACT

A method of selecting an antenna beam includes: selecting a beam port of a first phase progression matrix having a first subset of antenna ports terminated in respective first characteristic impedances; selecting a beam port of a second phase progression matrix that is separate from the first phase progression matrix and has a second subset of antenna ports terminated in respective second characteristic impedances; and at least one of: combining a first receive signal portion from the selected beam port of the first phase progression matrix and a second receive signal portion from the selected beam port of the second phase progression matrix, or providing a first portion of a transmit signal to the selected beam port of the first phase progression matrix and a second portion of the transmit signal to the selected beam port of the second phase progression matrix.

20 Claims, 10 Drawing Sheets

1300

Selecting one of a plurality of first beam ports of a first phase progression matrix having each antenna port of a first subset of a plurality of first antenna ports terminated in a respective first characteristic impedance, each of the plurality of first beam ports corresponding to one of a plurality of antenna beam directions ⎯ 1310

Selecting one of a plurality of second beam ports of a second phase progression matrix that is separate from the first phase progression matrix having each antenna port of a second subset of a plurality of second antenna ports terminated in a respective second characteristic impedance, each of the plurality of second beam ports corresponding to one of the plurality of antenna beam directions ⎯ 1320

At least one of: combining a first receive signal portion from the selected one of the plurality of first beam ports and a second receive signal portion from the selected one of the plurality of second beam ports, or providing a first portion of a transmit signal to the selected one of the plurality of first beam ports and a second portion of the transmit signal to the selected one of the plurality of second beam ports ⎯ 1330

FIG. 13

PARTIALLY-CONNECTED PHASE PROGRESSION MATRIXES

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc. Wireless communication devices have antennas to support communication over a range of frequencies.

Wireless communication systems are widely deployed to provide various telecommunication services such as telephony, video, data, messaging, and broadcasts. Typical wireless communication systems may employ multiple access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

It is often desirable to electronically steer an antenna beam for communication purposes and/or one or more other purposes. For example, a beam of a base station may be directed toward a user equipment to better receive signals from and/or transmit signals to the user equipment. Various techniques may be used to electronically steer an antenna beam, such as altering phase shifters associated with multiple antenna elements to provide a progressive phase shift across the antenna elements, e.g., along a linear array (which may be part of a two-dimensional array). As another example, referring to FIGS. 1-3, a beam steering system 100 includes a Butler matrix 110 that may be used to select one of a set of possible phase progressions for antenna elements 120. In this example, there are eight antenna elements 120 and the Butler matrix is an 8×8 Butler matrix. As better shown in FIG. 2, a Butler matrix is a combination of fixed phase shifts 210 (only one of which is labeled in FIG. 2) and quadrature hybrids 220, 260 (only two of which are labeled in FIG. 2) arranged in a structure that produces a number of progressive phase shifts at antenna ports 230 corresponding to different beam directions for a signal provided to or accessed at a set of beam ports 240. An N×N Butler matrix has N antenna ports and N beam ports, and provides N phase progressions corresponding to N different beams. Butler matrixes are discussed in Cetinoneri, B., Atesal, Y. A., and Rebeiz, G. M. (2011), "An 8×8 Butler Matrix in 0.13 μm CMOS for 5-6 GHz Multibeam Applications," *IEEE Transactions on microwave theory and techniques,* 59(2), 295-301 (URL: https://ieeexplore.ieee.org/abstract/document/5678820). A set of electrical lengths between a beam port and the antenna ports is different for each beam port such that the phase progression at the antenna ports is different for each beam port. While an electrical length between one beam port and one antenna port may be the same as the electrical length between another beam port and another antenna port, the set of electrical lengths (as a combination of magnitude and order of antenna port) is unique for each of the beam ports. Respective portions of a signal provided at any one of the beam ports 240 will reach each of the antenna ports 230 with a different phase and respective portions of a signal received by any one of the antenna ports 230 will reach each of the beam ports 240. Different phase portions of the received signal will be combined and received by each of the beam ports such that the signal at each beam corresponds to a different beam direction. The beam ports 240 labeled 1L, 2L, 3L, 4L correspond to first, second, third, and fourth beams to the left of boresight (of the array of the antenna elements 120) providable by the Butler matrix 110 and the beam ports 240 labeled 1R 2R, 3R, 4R correspond to first, second, third, and fourth beams to the left of boresight providable by the Butler matrix 110. The system 100 further includes a transmit/receive selector 130 for each of the antenna elements 120 (corresponding to each of the antenna ports 230). As shown in FIG. 3, a transmit/receive selector 300, which is an example of the transmit/receive selectors 130, includes a power amplifier 310, a low noise amplifier 320, and switches 330, 340. The switches 330, 340 connect the Butler matrix 110 to the respective antenna element 120 via the power amplifier 310 for a transmit mode and connect the Butler matrix 110 to the respective antenna element 120 via the low noise amplifier 320 for a receive mode. The system 100 further includes a beam direction switch 140 (BDS) that is controlled to select a desired one of the beam ports corresponding to a desired beam. The BDS 140 is connected to a transmit/receive signaling device 150, a receive portion of which is shown in FIG. 1, including a variable gain amplifier (VGA), a mixer, and a local oscillator (LO).

The Butler matrix 110 includes a crossover section 250 of transmission lines connecting quadrature hybrids 260 of the Butler matrix 110 to the antenna ports 230, and thus connecting the antenna elements 120 to the quadrature hybrids 260 nearest the antenna elements 120. Connecting an N×N Butler matrix to the antenna ports (for connection to the transmit/receive selectors 130, which may be called front ends), may result in long routings and crossovers that use a large area and result in high signal attenuation, especially at millimeter-wave frequencies and sub-millimeter-wave frequencies. The crossover section 250 may consume as much as one-fourth of the area of a chip containing the matrix 110.

SUMMARY

An example system includes: a first phase progression matrix comprising first antenna ports, first beam ports, a plurality of first phase shifters, and a plurality of first quadrature hybrids, the first beam ports corresponding to a plurality of primary beam directions and a plurality of phase progressions for the first antenna ports, the first antenna ports comprising one or more first connectable antenna ports, each being configured to be communicatively coupled to a respective one of one or more first antenna elements, and the first antenna ports comprising one or more first unused antenna ports; a second phase progression matrix comprising second antenna ports, second beam ports, a plurality of second phase shifters, and a plurality of second quadrature hybrids, the second beam ports corresponding to the plurality of primary beam directions and the plurality of phase progressions for the second antenna ports, the second antenna ports comprising one or more second connectable antenna ports, each being configured to be communicatively coupled to a respective one of one or more second antenna elements, and the second antenna ports comprising one or more second unused antenna ports; and a beam direction device configured to communicatively couple a common port to a selected one of the first beam ports and a selected one of the second beam ports.

An example antenna beam selecting method includes: selecting one of a plurality of first beam ports of a first phase progression matrix having each antenna port of a first subset of a plurality of first antenna ports terminated in a respective first characteristic impedance, each of the plurality of first beam ports corresponding to one of a plurality of antenna beam directions; selecting one of a plurality of second beam ports of a second phase progression matrix that is separate from the first phase progression matrix having each antenna port of a second subset of a plurality of second antenna ports terminated in a respective second characteristic impedance, each of the plurality of second beam ports corresponding to one of the plurality of antenna beam directions; and at least one of: combining a first receive signal portion from the selected one of the plurality of first beam ports and a second receive signal portion from the selected one of the plurality of second beam ports, or providing a first portion of a transmit signal to the selected one of the plurality of first beam ports and a second portion of the transmit signal to the selected one of the plurality of second beam ports.

An example antenna beam selection system includes: means for selecting one of a plurality of first beam ports of a first phase progression matrix having each antenna port of a first subset of a plurality of first antenna ports terminated in a respective first characteristic impedance, each of the plurality of first beam ports corresponding to one of a plurality of beam directions; means for selecting one of a plurality of second beam ports of a second phase progression matrix that is separate from the first phase progression matrix having each antenna port of a second subset of a plurality of second antenna ports terminated in a respective second characteristic impedance, each of the plurality of second beam ports corresponding to one of the plurality of beam directions; and at least one of: means for combining a first receive signal portion from the selected one of the plurality of first beam ports and a second receive signal portion from the selected one of the plurality of second beam ports; and means for providing a first portion of a transmit signal to the selected one of the plurality of first beam ports and a second portion of the transmit signal to the selected one of the plurality of second beam ports.

BRIEF DESCRIPTION OF THE DRAWINGS

FIG. 13 is a block flow diagram of a method of selecting an antenna beam.

DETAILED DESCRIPTION

Techniques are discussed herein for steering antenna beams using selectable phase progressions of phase progression matrixes. For example, multiple phase progression matrixes may be used in combination with each matrix having some antenna ports connected to characteristic impedances and some antenna ports connected to receive circuitry for processing receiving signals or to transmit circuitry for providing transmission signals. With half or fewer of the antenna ports connected to the other circuitry, transmission line crossovers may be avoided between antenna elements and quadrature hybrids (of phase progression matrixes) nearest the antenna elements. Further, by selecting different beam ports of the different phase progression matrixes concurrently, intermediate antenna beams between primary antenna beams may be selected and used. Other configurations, however, may be used.

Items and/or techniques described herein may provide one or more of the following capabilities, as well as other capabilities not mentioned. Area for providing beam steering circuitry may be reduced by avoiding transmission line crossovers between antenna elements and quadrature hybrids (for phase progression matrixes) nearest the antenna elements. Insertion loss of such transmission line crossovers for phase progression matrixes may be avoided, and power may be saved. Antenna beam coverage may be increased and a gain cumulative distribution function improved. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
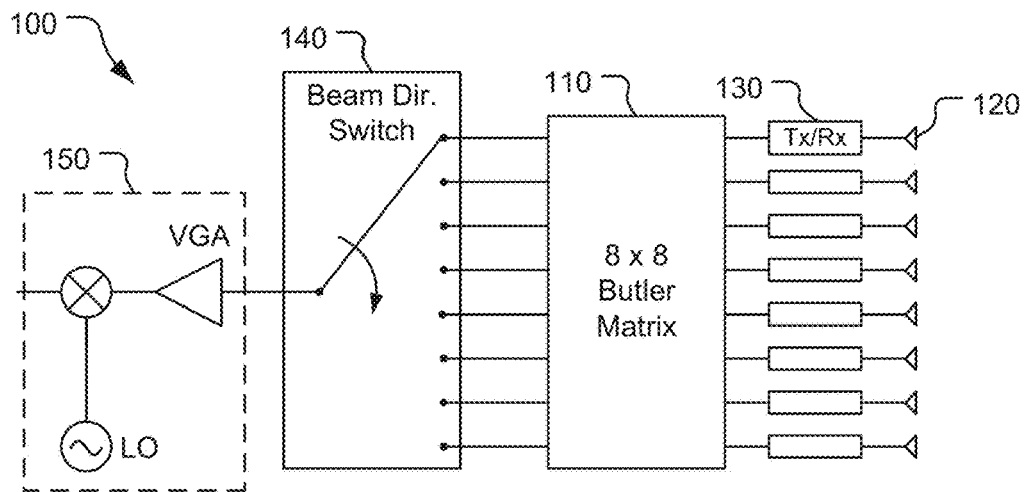
FIG. 1 is a schematic diagram of a beam steering system.
Figure 2:
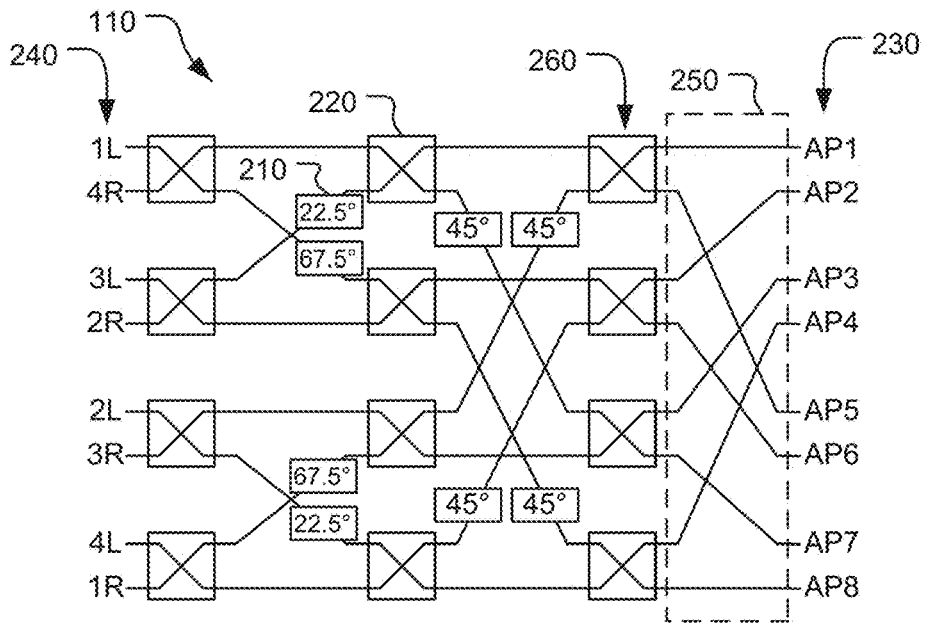
FIG. 2 is a circuit diagram of a Butler matrix shown in FIG. 1.
Figure 3:
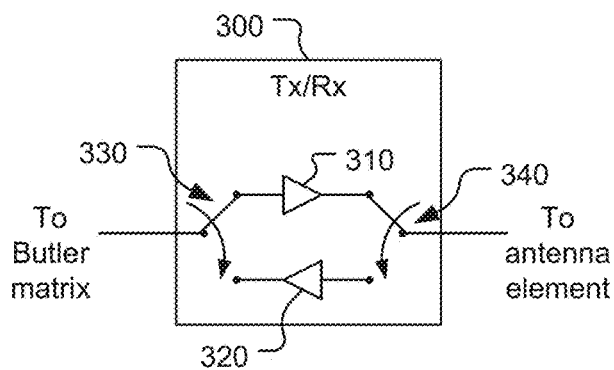
FIG. 3 is a circuit diagram of a transmit/receive selector shown in FIG. 1.
Figure 4:
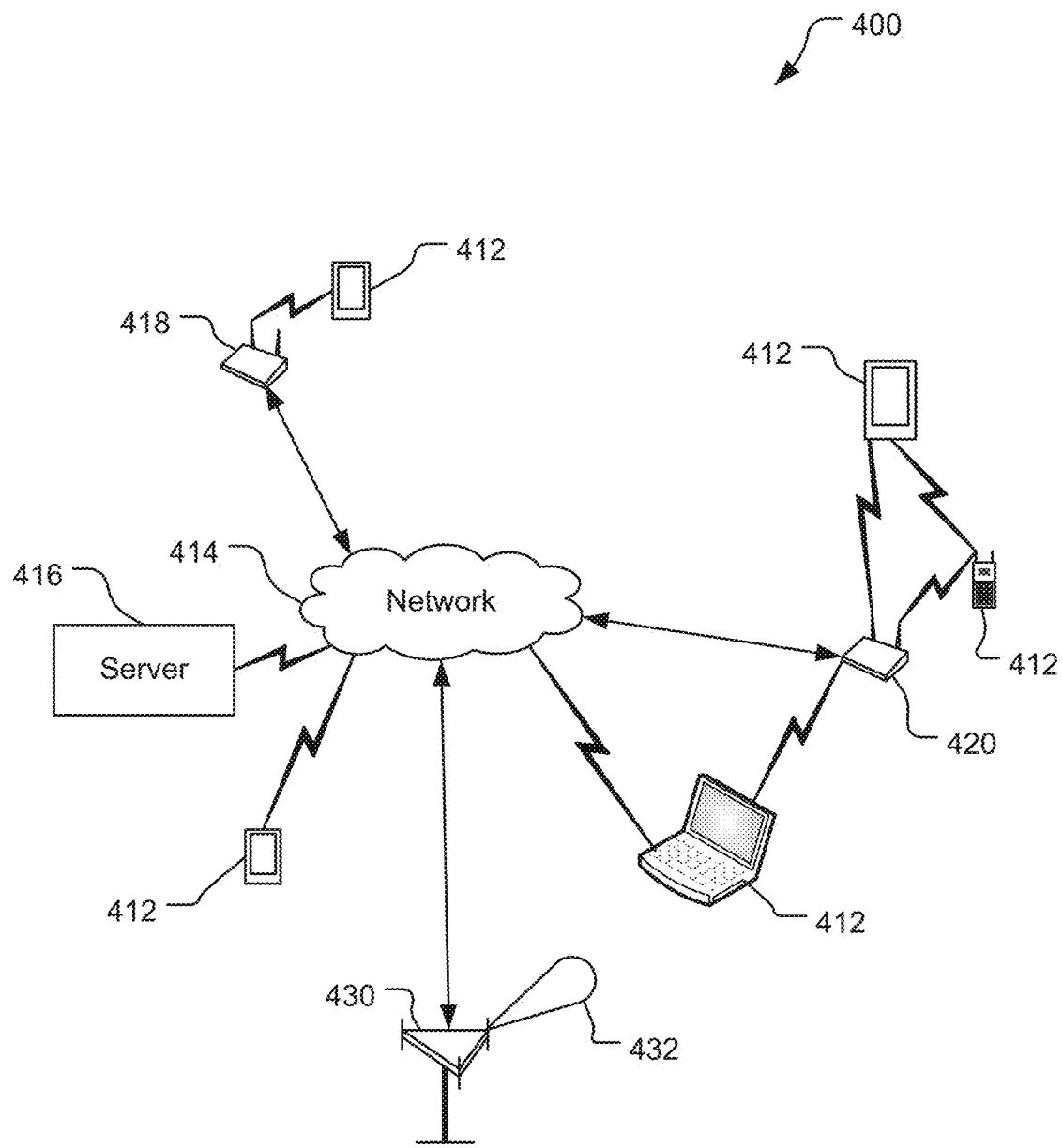
FIG. 4 is a schematic diagram of a communication system.

Referring to FIG. 4, a communication system 400 includes mobile devices 412, a network 414, a server 416, access points (APs) or customer premises equipment (CPE) 418, 420, and a base station 430. The communication system 400 is a wireless communication system in that components of the communication system 400 can communicate with one another (at least some times) using wireless connections directly or indirectly, e.g., via the network 414, one or more of the access points 418, 420, and/or the base station 430 (and/or one or more other devices not shown, such as one or more other base stations). For indirect communications, the communications may be altered during transmission from one entity to another, e.g., to alter header information of data packets, to change format, etc. The mobile devices 412 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the communication system 400 and may communicate with each other and/or with the mobile devices 412, the network 414, the server 416, the Aps or CPEs 418, 420, and/or the base station 430. For example, such other devices may include internet of thing (IoT) devices, medical devices, home entertainment and/or automation devices, automotive devices, etc. The mobile devices 412 or other devices may be configured to communicate in different networks and/or for different purposes (e.g., 5G, Wi-Fi communication, multiple frequencies of Wi-Fi communication, satellite communication and/or positioning, one or more types of cellular communications (e.g., GSM (Global System for Mobiles), CDMA (Code Division Multiple Access), LTE (Long-Term Evolution), etc.), Bluetooth® communication, etc.). The base station 430 is shown separated from the network 414 but may be part of the network 414. As shown, the base station 430 is configured to select antenna beams such as a beam 432 for communication, e.g., with the beam 432 directed toward a laptop computer in this example. The base station 430 is configured to select the beam 432 using a partially-connected set of phase progression matrixes as discussed herein. Devices other than a base station (e.g., a CPE, automobile, user device, etc.) may be equipped with phase progression matrixes for selecting antenna beams as discussed herein.

Figure 5:
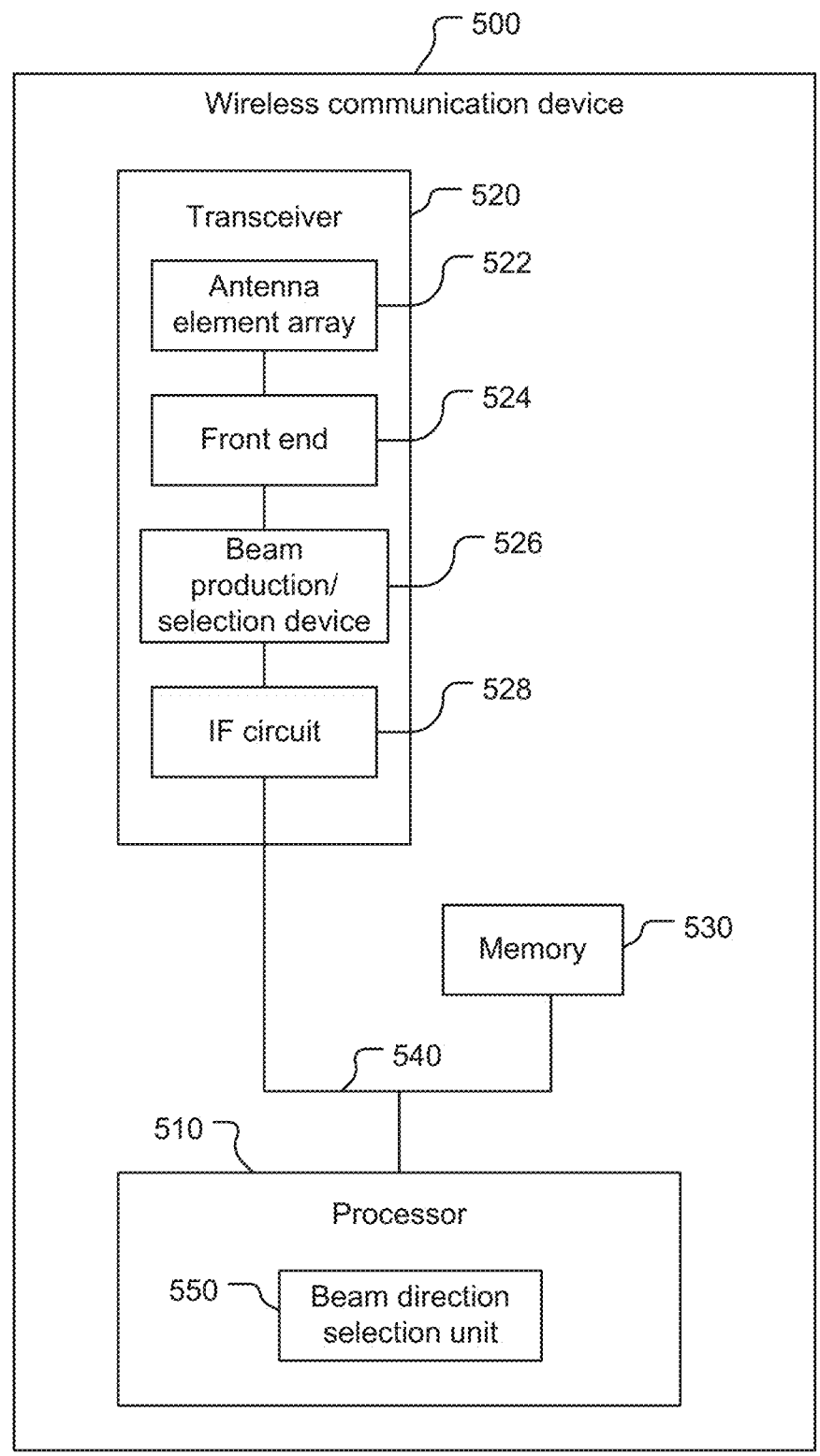
FIG. 5 is a block diagram of a wireless communication device, examples of which are shown in FIG. 4.

Referring to FIG. 5, a wireless communication device 500, of which any of the devices in FIG. 4 that may transmit and/or receive signals wirelessly (e.g., mobile devices 412 and/or the base station 430) may be an example, includes a processor 510, a transceiver 520, and a memory 530 communicatively coupled to each other by a bus 540 or other interconnection(s). The device 500 may include the components shown in FIG. 5. The device 500 may include one or more other components such as one or more components in addition to the components shown and/or one or more additional components included in the components shown. For example, the transceiver 520 may include a wireless transmitter, a wireless receiver, multiple antennas, etc. The memory 530 may be a non-transitory, processor-readable storage medium that includes software with processor-readable instructions that are configured to cause the processor 510 to perform functions, e.g., as discussed herein.

The transceiver 520 includes an antenna element array 522, a front end 524, a beam production/selection device 526, and a frequency conversion circuit 528. The antenna element array 522 includes an array of antenna elements, e.g., a one-dimensional array or a two-dimensional array (e.g., of rows and columns of antenna elements). The front end 524 is communicatively coupled to the antenna element array 522 and the beam production/selection device 526 and configured to direct outbound (transmit) signals from the beam production/selection device 526 to the antenna element array 522 and to direct inbound (receive) signals from the antenna element array 522 to the beam production/selection device 526 and/or to amplify such signals. The beam production/selection device 526 is configured to provide multiple different phase progressions corresponding to the antenna element array 522 and to select one of the phase progressions corresponding to a desired beam direction, e.g., under control of the processor 510 (e.g., in accordance with one or more control signals received from the processor 510). In transmit operation the frequency conversion circuit 528 is communicatively coupled to the beam production/selection device 526 and configured to provide signals to be radiated by the antenna element array 522. In receive operation, the frequency conversion circuit 528 is communicatively coupled to the beam production/selection device 526 to receive and process signals that are received by, and provided to the frequency conversion circuit 528 from, the beam production/selection device 526. In transmit operation the frequency conversion circuit 528 may be configured to convert baseband digital signals from the processor 510 to IF signals, to convert the IF signals to analog RF (Radio Frequency) signals (e.g., using a mixer and a digital-to-analog converter (DAC)), and to provide the RF signals to the beam production/selection device 526 for phase adjusting for a desired beam and radiation by the antenna element array 522 in the desired beam. In receiver operation, the frequency conversion circuit 528 is configured to convert analog RF signals received by the antenna element array 522 to IF signals (e.g., using a mixer), to convert the IF signals to baseband digital signals (e.g., using a mixer and an analog-to-digital converter (ADC)), and to send the baseband digital signals to the processor 510. The frequency conversion circuit 528 may be either a super heterodyne circuit that converts signals from RF to baseband and vice versa in a two-step frequency conversion process using an intermediate frequency, or the frequency conversion circuit 528 may be a direct conversion circuit that converts signals from RF to baseband and vice versa in a single-step frequency conversion process without the use of an intermediate frequency (IF), and may be implemented as Zero IF (ZIF) circuitry.

The description herein may refer to the processor 510 performing a function, but this includes other implementations such as where the processor 510 executes software (stored in the memory 530) and/or firmware. The description herein may refer to the device 500 performing a function as shorthand for one or more appropriate components (e.g., the processor 510 and the memory 530) of the device 500 performing the function. The processor 510 (possibly in conjunction with the memory 530 and, as appropriate, the transceiver 520) may include a beam direction selection unit 550. The beam direction selection unit 550 is discussed further below, and the description may refer to the processor 510 generally, or the device 500 generally, as performing any of the functions of the beam direction selection unit 550, with the device 500 being configured to perform the functions of the beam direction selection unit 550.

Figure 6:
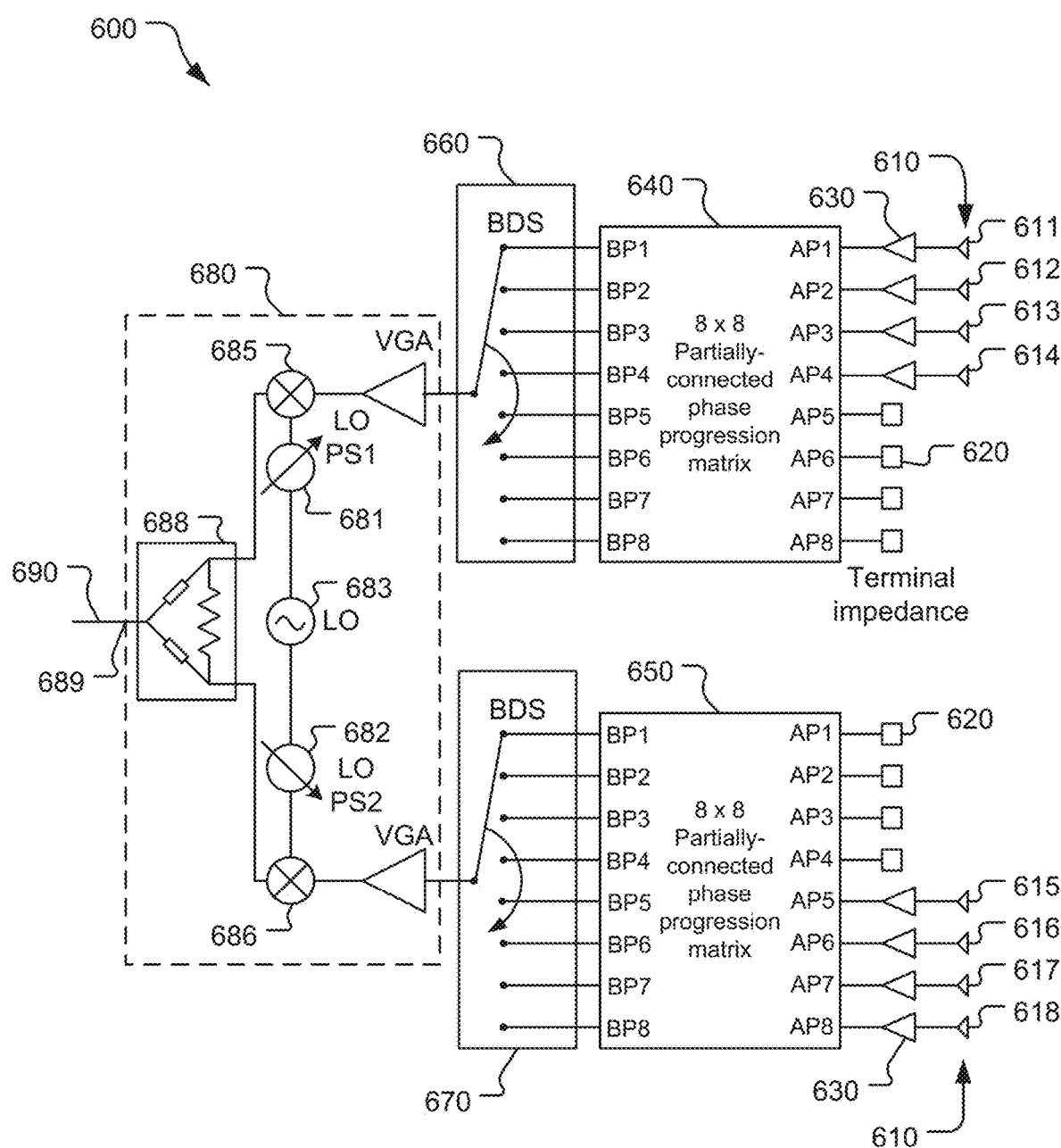
FIG. 6 is a circuit diagram of a receiver that includes multiple partially-connected phase progression matrixes.

Referring to FIG. 6, an example receiver 600 of the transceiver 520 includes an array 610 of antenna elements 611, 612, 613, 614, 615, 616, 617, 618, terminal impedances 620, LNAs 630 (low noise amplifiers), phase progression matrixes 640, 650, beam direction switches 660, 670, and a frequency conversion circuit 680. The phase progression matrixes 640, 650 are partially-connected phase progression matrixes (e.g., Butler matrixes), each being an N×N matrix (here an 8×8 matrix, but other values of N are possible, e.g., 4 or 16) communicatively coupled to fewer than N antenna elements, i.e., with fewer than all respective antenna ports being communicatively coupled to respective antenna elements (and, e.g., the remaining portion of the antenna ports being terminated in terminal impedances). In this example, each of the matrixes 640, 650 has N/2 (here 8/2 or 4) antenna ports each communicatively coupled to a respective one of the antenna elements 611-618. Other configurations may be used, e.g., with a beam-forming network other than a Butler matrix, e.g., a network with variable phase shifters for each antenna port where the phase shifts introduced by the phase shifters are dependent upon which beam port is selected. As another example, configurations with more than two phase progression matrixes may be used, with one or more of the phase progression matrixes having fewer than N/2 antenna ports each communicatively coupled to a respective antenna element. Having two phase progression matrixes each with N/2 antenna ports coupled to antenna elements enables coupling to antenna elements without any crossovers with a minimum number of phase progression matrixes to avoid the crossovers (thus avoiding crossover area and associated increases in insertion loss due to the crossover routing while conserving (e.g., minimizing) the total area used by the phase progression matrixes). The LNAs 630 provide an example of (at least a portion of) the front end 524. The phase progression matrixes 640, 650 and the beam direction switches 660, 670 comprise an example of the beam production/selection device 526. The frequency conversion circuit 680 provides an example of a receive portion of the frequency conversion circuit 528. A transmit portion, similar to receive portion of the frequency conversion circuit 680 shown, for signal transmissions is included in the frequency conversion circuit 528 (but not shown) along with circuitry to select which of the receive portion or the transmit portion of the frequency conversion circuit 528 is presently used in some examples. In some examples, separate circuitry and/or matrixes for transmission are implemented.

Separate antennas may be used for transmission and reception, or the same antennas may be used for both signal reception and signal transmission. The antenna elements 611-618 of receiver 600 shown in FIG. 6 may be dedicated to signal reception, and a transmitter may be provided that is dedicated to signal transmission. Such a transmitter could be similar to the receiver 600, but with the directions of the VGAs reversed and the LNAs 630 replaced by power amplifiers (PAs) with directions of the PAs being opposite the directions of the LNAs 630. In such examples, the matrixes 640, 650 may be shared by transmit and receive, or separate matrixes may be implemented. Alternatively, antenna elements may be used for both reception and transmission. For example, a transmit/receive selector like the transmit/receive selector 300 may be used instead of each of the LNAs 630. A single pole, double throw (SPDT) switch can be provided between the BDS and the frequency conversion circuit to connect the BDS to either receive circuitry or transmit circuitry (if one BDS is used for both transmit and receive). With the same BDS used for transmit and receive, the BDS may include a bidirectional amplifier and switches provided at the input and output of this amplifier (e.g., as shown below for an amplifier 940). Alternatively, the bidirectional amplifier may not be used, and the switch between the BDS and frequency conversion circuit used to select transmission or reception. Alternatively still, separate BDSes may be used for transmission and reception, and a transmission/reception selector provided at each beam port of the phase progression matrix to selectively connect to the transmission BDS or the reception BDS (or separate routing provided to route signals to respective matrixes).

Figure 7:
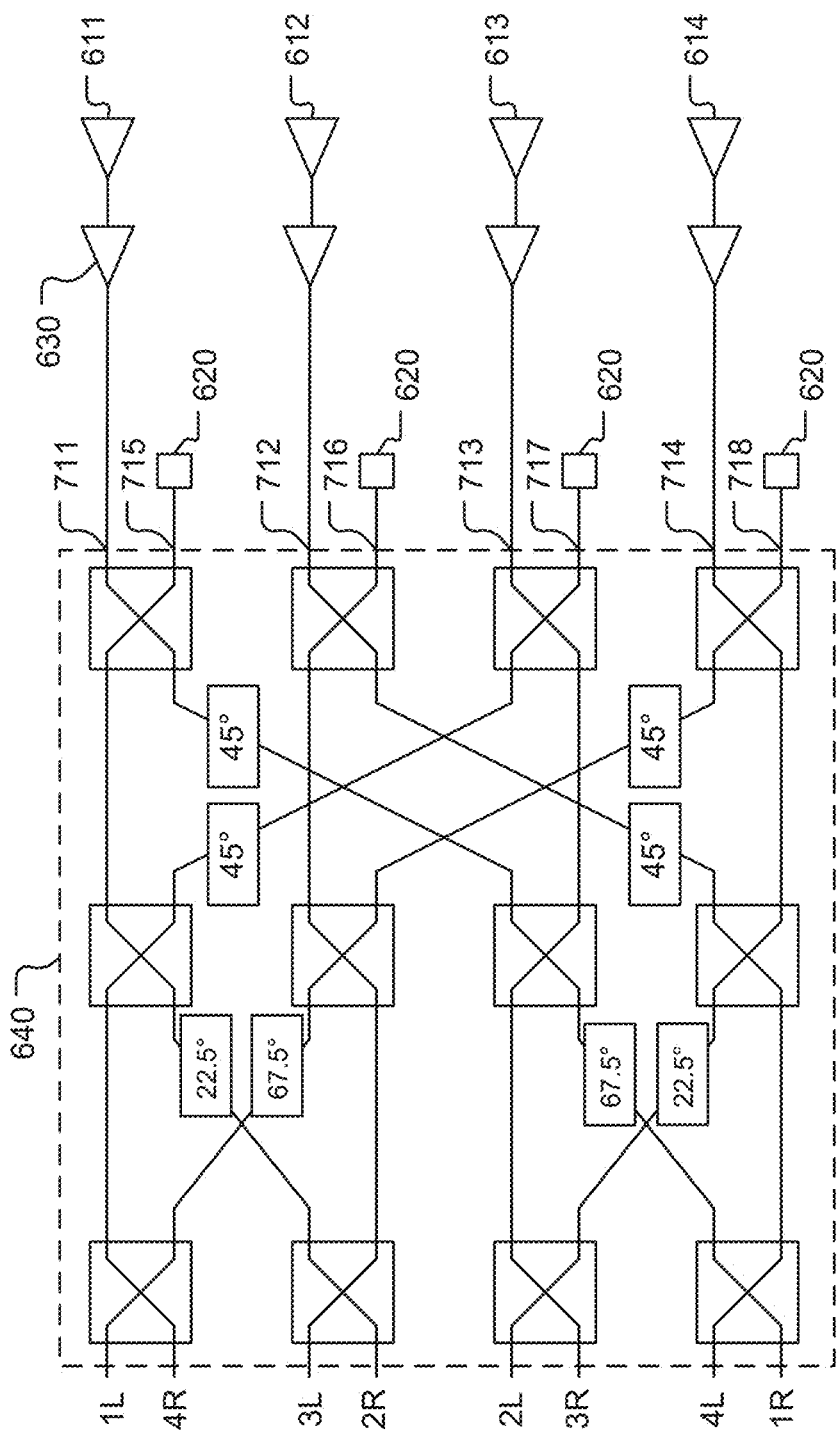
FIG. 7 is a circuit diagram of a partially-connected phase progression matrix, terminal impedances, amplifiers, and antenna elements shown in FIG. 6.

Referring to FIG. 7, the phase progression matrixes 640, 650 are partially connected, with some antenna ports communicatively coupled to antenna elements (and some antenna ports connected to terminal impedances). The arrangement of the antenna ports AP1-AP8 shown in FIG. 6 is to facilitate understanding of connections whereas FIG. 7 shows a physical layout of the antenna ports AP1-AP8 of the phase progression matrix 640. As shown in FIG. 7, the phase progression matrix 640 has antenna ports 711, 712, 713, 714 (corresponding to antenna ports AP1, AP2, AP3, AP4) communicatively coupled to the antenna elements 611-614, respectively, through respective one of the LNAs 630. The phase progression matrix 640 has antenna ports 715, 716, 717, 718 (corresponding to antenna ports AP5. AP6. AP7. AP8) each coupled to a respective one of the terminal impedances 620. Each of the antenna ports 715-718 are persistently (e.g., permanently) coupled to a respective one of the terminal impedances 620 (with different ones of the terminal impedances 620 possibly having different impedances). The phase progression matrix 650 (not shown in FIG. 7) is configured similarly to the phase progression matrix 640, but with the antenna ports 715-718 communicatively coupled to the antenna elements 615-618 through LNAs 630 and the antenna ports 711-714 coupled to terminal impedances 620. Between the combination of phase progression matrixes (i.e., two or more phase progression matrixes), each antenna port may be connected to a respective antenna element without the same antenna port in multiple phase progression matrixes being connected to an antenna element. That is, with multiple phase progression matrixes each having N antenna ports, only one each of AP1-APN of the combination of the phase progression matrixes is connected to an antenna element. For example, AP1 of only one of the phase progression matrixes is connected to an antenna element and each AP1 of all other phase progression matrixes in the combination of phase progression matrixes is connected to a terminal impedance. With at least half of the antenna ports 711-718 of each phase progression matrix connected to the terminal impedances 620, no crossovers are used to connect the antenna ports 711-718 of a combination of two or more phase progression matrixes (e.g., of the two phase progression matrixes 640, 650) to the antenna elements 611-618.

Each of the phase progression matrixes 640, 650 provides a linear, monotonic phase progression from a first antenna port to the $N^{th}$ antenna port, with pairs of consecutive antenna ports (e.g., the first and second antenna ports (e.g., AP1 and AP2, or the antenna ports 711, 712), the second and third antenna ports (e.g., AP2 and AP3, or the antenna ports 712, 713), etc.) having the same phase difference between the antenna ports. The matrixes 640, 650 may provide the same (within design and manufacturing tolerances) phase progressions. Half of the antenna ports of the phase progression matrix 640 (here a first half of consecutive ones of the antenna ports, here the antenna ports AP1-AP4 corresponding to the antenna ports 711-714) are connected to a respective half of the antenna elements 611-618, here the antenna elements 611-614, and half of the antenna ports of the phase progression matrix 650 (here a second half of consecutive ones of the antenna ports, here the antenna ports AP5-AP8) are connected to a respective half of the antenna elements 611-618, here the antenna elements 615-618. The two halves of the antenna ports connected to antenna elements are different consecutive halves of the antenna ports corresponding to the total phase progression provided by each of the matrixes 640, 650.

The terminal impedances 620 are matched impedances for the respective antenna port. With the terminal impedances 620 being matched impedances (also called characteristic impedances), a transmit signal incident upon the terminal impedance 620 from the phase progression matrix 640 will be absorbed by the terminal impedance 620 with little or no reflection, and an antenna port connected to one of the terminal impedances 620 will contribute little or no receive signal. A noise impact of connected antenna ports to terminating impedances may have less effect on system performance than an insertion loss of crossovers for fully-connected phase progression matrixes.

Figure 8:
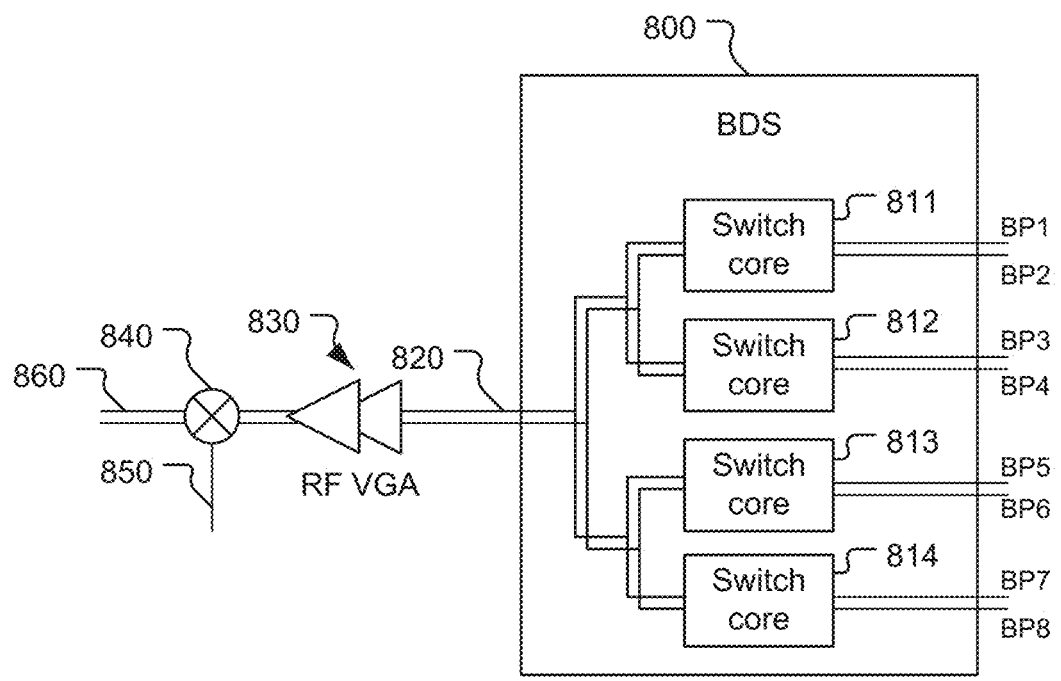
FIG. 8 is a circuit diagram of a beam direction switch and receive components shown in FIG. 6.

Referring to FIG. 8, a BDS 800 (Beam Direction Switch) is an example of each of the beam direction switches 660, 670 for signal reception. The BDS 800 provides an active multiplexer for selecting a beam direction and includes switch cores 811, 812, 813, 814 that are each communicatively coupled to a respective pair of the beam ports BP1-BP8 of a respective one of the phase progression matrixes 640, 650. The switch cores 811-814 are configured to selectively provide a differential output signal 820 corresponding to a desired one of the beam ports BP1-BP8. In this example, the switch cores 811-814 are each configured to provide a respective differential output signal, but other configurations of switch cores may be used. The BDS 800 is controlled to select one of the beam port inputs to use to produce the differential output signal 820 that is input to an RF VGA (pair) 830. The RF VGA pair 830 receives the differential output signal 820 from the BDS 800 and sends an output signal to a mixer 840. The mixer receives the signal from the RF VGA pair 830 and an oscillator signal 850, and mixes these signals to produce a differential IF or baseband signal 860.

Figure 9:
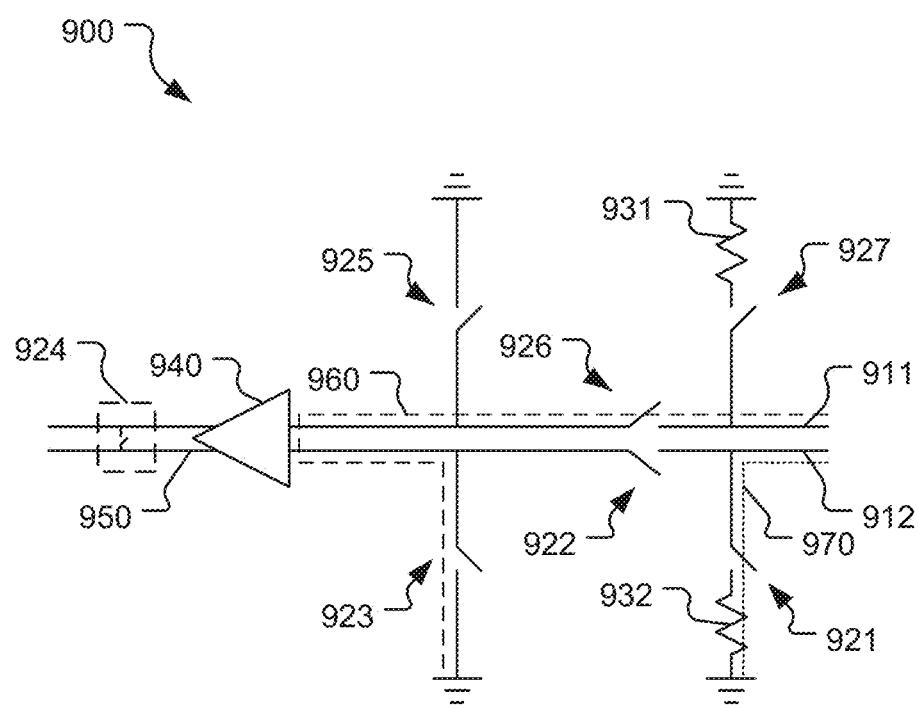
FIG. 9 is a circuit diagram of a switch core shown in FIG. 8.

Referring to FIG. 9, a switch core 900 is an example of the switch cores 811-814. The switch core 900 includes inputs 911, 912, switches 921, 922, 923, 924, 925, 926, 927, matched impedances 931, 932, and an amplifier 940. The inputs 911, 912 may be connected to respective beam ports, e.g., of the matrix 640. By selectively opening and closing the switches 921-923 and 925-927, the desired input signal (from either the input 911 or the input 912) is used to produce a differential output signal 950, while the other input signal is terminated in one of the matched impedances 931, 932 (which may be incorporated into the switches 927, 921, respectively). For example, the switches 921, 923, 926 are closed and the switches 922, 925, 927 are opened to provide the input signal on the input 911 to the amplifier 940 and to direct the input signal on the input 912 to the matched impedance 932 as indicated by dashed lines 960, 970, respectively. As another example, both of the switches 921, 927 are closed to terminate each of the inputs 911, 912 to the matched impedances 931, 932, respectively. Each of the matched impedances 931, 932 may provide a terminal impedance for a respective unused beam port, such that an unused beam port is selectively coupled to a terminal impedance. The switch 924 is closed to prevent the differential output signal 950 from being provided to downstream circuitry, e.g., the RF VGA pair 830 and to provide a short circuit termination to the transmission line connecting the amplifier 940 to the other switch cores and the RF VGA pair 830. The switch 924 of each of the switch cores 811-814 is selectively operated (by closing three of the four switches 924 and opening one of the switches 924) to provide an output signal from a selected one of the switch cores 811-814 to the RF VGA pair 830 and provide impedance matching between the RF VGA pair 830 and the selected one of the switch cores 811-814. A beam port of each of the matrixes 640, 650 is connected to the frequency conversion circuit 680 in response to the beam direction selection unit 550 controlling the switches 921-927 of each of the switch cores 811-814 of each of the BDSs 660, 670. Thus, a selected one of the beam ports of each of the matrixes 640, 650 may be used to provide a signal to the frequency conversion circuit 680, and the remaining beam ports of each of the matrixes 640, 650 connected to respective matched impedances. The selected beam ports are communicatively coupled to a common port 689 such that signals from the selected beam ports are combined by the frequency conversion circuit 680 and output as an output signal 690.

The common port 689 may be coupled to one or more other components of a system to provide desired functionality. For example, the receiver 600 may be for receiving communication signals and/or positioning signals and the common port 689 may be communicatively coupled to one or more components for processing (e.g., decoding and/or measuring) received signals from various directions to relay communications to a user, to determine a location of a device containing the receiver 600, etc. The receiver 600 may, for example, be disposed in a chip, or in an integrated circuit (IC), or a module (e.g., a millimeter wave IC/module) that is connected to one or more other components (e.g., a baseband IC, a transceiver chip, etc.). The receiver 600 may be communicatively coupled to the other component(s) via a transmission line such as a cable, a coaxial line, a microstrip line, or some other form of routing.

Figure 10:
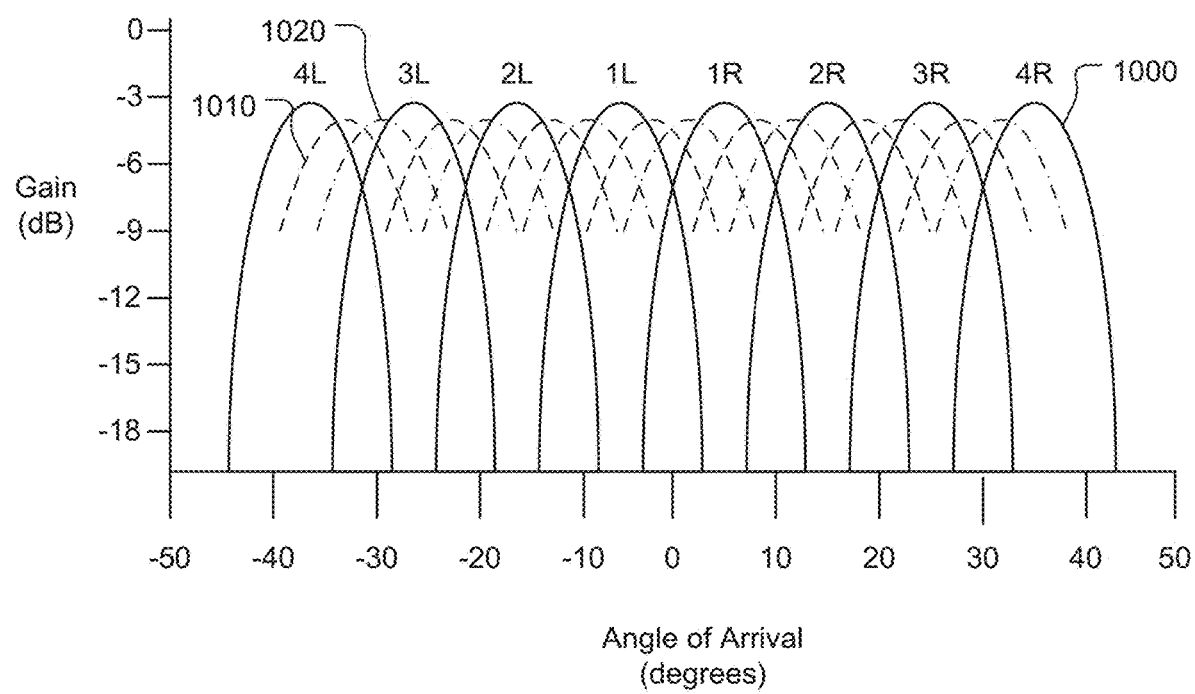
FIG. 10 is a graph of primary and intermediate beams selectable using the partially-connected phase progression matrixes shown in FIG. 6.

Referring to FIG. 10, various beams may be used by selectively connecting beam ports of the matrixes 640, 650 to the frequency conversion circuit 680. The beam ports BP1-BP8 correspond to beams 1L, 4R, 3L, 2R. 2L, 3R, 4L, 1R such that, for example, when the beam port BP1 of the matrix 640 and the beam port BP1 of the matrix 650 are connected to the frequency conversion circuit 680, the beam 1L is selected for receiving signals by the antenna elements 611-618. By selecting and summing signals from the same beam port of each of the matrixes 640, 650, a primary beam may be selected for use in receiving a signal from the antenna elements 611-618. For example, by selecting beam port BP2 (corresponding to beam 4R) of the matrix 640 and beam port BP2 (corresponding to beam 4R) of the matrix 650, a primary beam 1000 may be used for signal reception. By selecting and summing/subtracting signals from different beam ports of the matrixes 640, 650, intermediate beams (between adjacent beams of the primary beams 4L, 3L, 2L, 1L, 1R, 2R, 31R, 4R) may be selected for use in receiving a signal by the antenna elements 611-618. For example, by selecting beam port BP7 (corresponding to beam 4L) of the matrix 640 and subtracting therefrom (by adding out of phase) beam port BP3 (corresponding to beam 3L) of the matrix 650, an intermediate beam 1020 may be used for signal reception. With the matrixes 640, 650 being 8×8 arrays, 16 intermediate beams may be produced, with 11 of these intermediate beams being unique intermediate beams. As another example, by selecting beam port BP3 (corresponding to beam 3L) of the matrix 640 and subtracting therefrom beam port BP7 (corresponding to beam 4L) of the matrix 650, an intermediate beam 1010 may be used for signal reception. Thus, with the matrixes 640, 650 being N×N matrixes, and with N=8 in this example, there are 8 different primary beams, or effectively a 3-bit phase shifter, but using the intermediate beams as well provides effectively a 4-bit phase shifter worth of selectable beams using hardware of a 3-bit phase shifter. Thus, not only can the example receiver 600 provide similar functionality to the beam steering system 100 with much less area occupied (due to the avoidance of crossovers), intermediate beams may be used that will provide improved beam coverage (e.g., an improved gain cumulative distribution function (CDF)) compared to the beam steering system 100. Due to the linear phase progression nature of the matrixes 640, 650 and connections of different antenna ports to antennas for the matrixes 640, 650, combining beam port X of the matrix 640 with beam port Y of the matrix 650 will yield a different intermediate beam direction than combining beam port Y of the matrix 640 with beam port X of the matrix 650. Portions of the intermediate beams are shown in FIG. 10 for the sake of simplicity of the figure. Beam selection similar to that discussed above for reception may be implemented for signal transmission by a selected primary beam or intermediate beam, with beam ports for a desired beam being powered for signal transmission.

Figure 11:
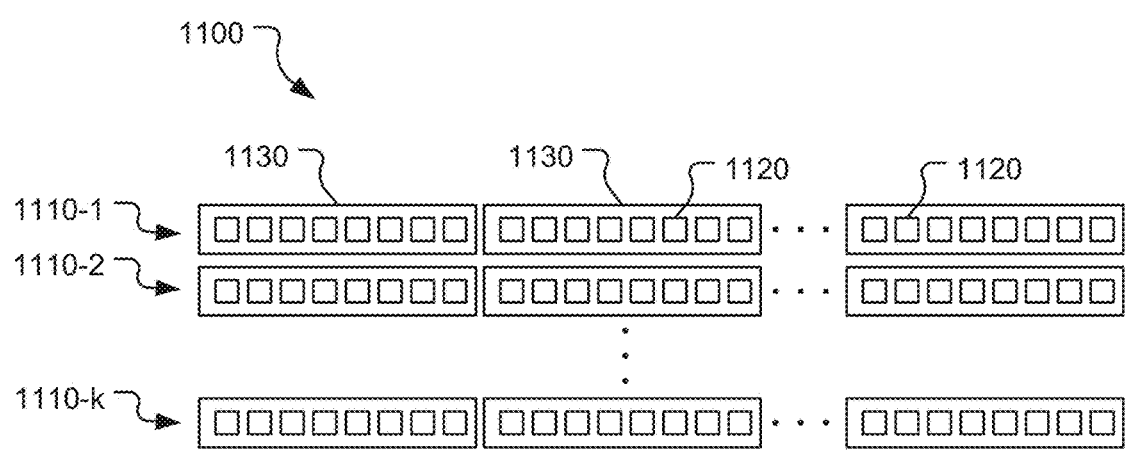
FIG. 11 is an array of antenna elements arranged in subarrays each comprising multiple partially-connected phase progression matrixes.

Referring to FIG. 11, multiple sets of partially-connected phase progression matrixes may be used to provide a two-dimensional, beam-steered antenna array. For example, an array 1100 includes k rows 1110-1, 1110-2, . . . , 1110-k of antenna elements 1120, with each row containing M subarrays 1130 of the antenna elements 1120, and each of the subarrays 1130 having a phase progression within the respective row controlled by a set of (e.g., two) partially-connected phase progression matrixes, e.g., a set of two partially-connected phase progression matrixes such as the receiver 600 and/or a similarly constructed transmitter. Thus, the array 1100 comprises a k×M×N antenna array comprising k rows of M subarrays 1130 with each subarray 1130 comprising a 1×N set of the antenna elements 1120 connected to, for example, two N×N partially-connected phase progression matrixes. Adjacent ones of the antenna elements 1120 may be called consecutive antenna elements. Consecutive antenna elements may be connected to consecutive antenna ports of a phase progression matrix to direct a beam from the antenna elements in a desired direction. The processor 510 is configured to control the phase shift provided by phase shifters 681, 682 (FIG. 6) to a local oscillator signal provided by a local oscillator 683 to provide phase shifts between the subarrays 1130 within a row and phase shifts between rows. The phase shifts between and within the subarrays 1130 in a row provide beam steering parallel to the rows 1110 and the phase shifts between the rows 1110 provide beam steering parallel to columns of the antenna elements 1120. The phase shifters 681, 682 provide similar phase shifts within the same subarray 1130, and are controlled (by the beam direction selection unit 550) to provide phase shifts between adjacent subarrays 1130 in the same row 1110 such that adjacent ones of the antenna elements 1120 in different subarrays 1130 have a similar phase difference as adjacent antenna elements 1120 within each of the subarrays 1130. The phase differences between adjacent antenna elements 1120 within each of the subarrays 1130 are provided by the phase progression matrixes 640, 650. The phase shifts provided by the phase shifters 681, 682 of the subarrays 1130 of different rows 1110 in the same column of subarrays 1130 have a phase difference (if any) controlled to direct a beam of the array 1100 as desired parallel to columns of the array 1100 (as shown, parallel to a vertical plane of the array 1100). The phase differences between the rows 1110 will have a desired progression (with each pair of adjacent rows having the same inter-row phase difference) for the desired vertical beam steering. The phase shifters 681, 682 may be disposed at locations other than the locations shown in FIG. 11, e.g., between mixers 685, 686 and power combiner 688 (here a Wilkinson bridge), or may be replaced or supplemented by ADCs (e.g., in baseband circuitry) such that signals may be processed in the digital domain, which may for example enable hybrid beamforming. IF or baseband VGAs may be provided between the mixers 685, 686 and the power combiner 688, with gains of the RF VGAs (830) and/or the IF or baseband VGAs controlled (e.g., by a modem) based on a dynamic range of a data converter (e.g., to attempt to maximize the dynamic range of the data converter). The mixers 685, 686 are configured to mix signals from respective VGAs with signals from the local oscillator 683 as phase shifted by the phase shifters 681, 682, respectively. The power combiner 688 is configured to combine a first signal from the phase progression matrix 640 (here, via a VGA and the mixer 685) and a second signal from the phase progression matrix 650 (here, via a VGA and the mixer 686). The phase shifters 681, 682 in FIG. 6 are optional and may be omitted in some examples. A combiner (e.g., a current combiner) other than a power combiner may be used in some implementations. For transmit applications, a signal splitter (e.g., power splitter) may be used.

Using partially-connected phase progression matrixes as discussed to avoid crossovers may provide one or more of several advantages, including a physical size advantage, performance improvement, cost saving, and/or power consumption saving. For example, avoiding crossovers may provide a routing distance improvement of a reduction in insertion loss of about 12 dB for a 2×8 array, with a corresponding power saving, e.g., about a 20% power saving (e.g., about 384 mW for a 2×8 dual-polarized array). As another example, physical area that would be used for crossovers may be eliminated, e.g., about 8 mm$^2$ for a 2×8 array for each of transmission and reception arrays. As another example, a number of selectable beams using phase progression matrixes may be increased, e.g., from 8 beams to 19 beams for two partially-connected 8×8 phase progression matrixes. By using two N×N phase progression matrixes and selectively combining signals from the beam ports of the different matrixes, more than N beams (e.g., more than 2N beams) may be produced without using a 2N×2N phase progression matrix, and thus avoiding the complexity of a 2N×2N matrix and using much less chip area than would be used for a 2N×2N phase progression matrix, even without crossovers. Further, the additional beams (beyond N beams) may be provided without hardware beyond that for implementing the two phase progression matrixes and connecting beam ports of the different matrixes. As another example, gain decrease with beam scanning may be reduced, e.g., from about 4 dB with a single 8×8 phase progression matrix to about 1 dB for using two 8×8 partially-connected phase progression matrixes. As another example, antenna gain CDF may improve (e.g., simulation with three antenna modules improved 0.8 dB for 50$^{th}$ percentile spherical coverage).

Figure 12:
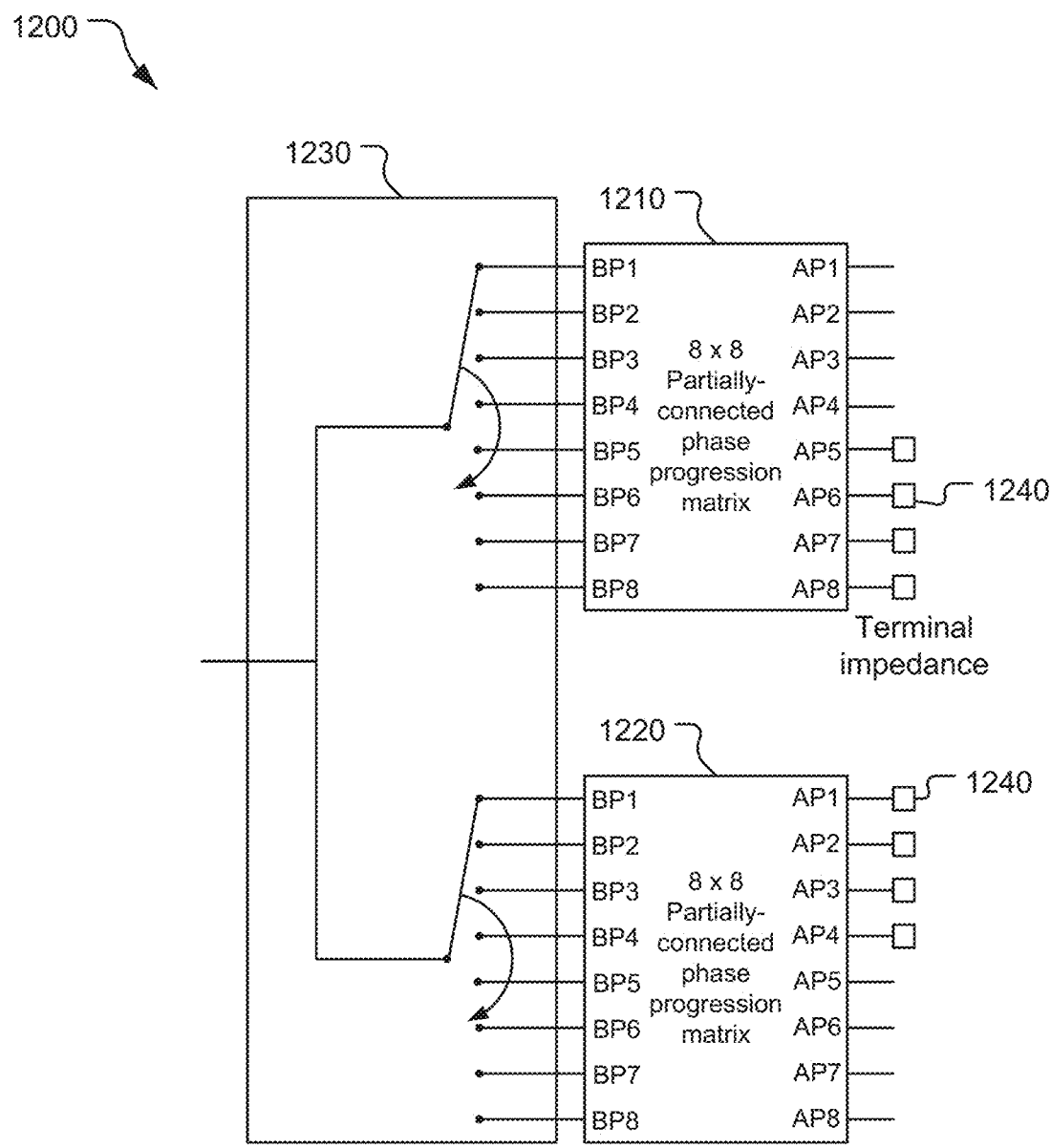
FIG. 12 is a simplified diagram of a system including partially-connected phase progression matrixes.

Various portions or combinations of portions of apparatus discussed may be used. For example, referring to FIG. 12, a system 1200 includes partially-connected phase progression matrixes 1210, 1220, and a beam direction device 1230 configured to couple a selected beam port of the matrix 1210 and a selected beam port of the matrix 1220. The beam direction device 1230 may, for example, comprise the BDSs 660, 670 and may also comprise the frequency conversion circuit 680, and/or the beam direction device 1230 may comprise complementary BDSs and may also comprise a frequency conversion circuit for signal transmission. Unused antenna ports of each of the matrixes 1210, 1220 are coupled to terminal impedances 1240, which may be considered to be part of the matrixes 1210, 1220 in some examples. Each unused antenna port is isolated from any antenna element. Each antenna port to be connected to an antenna element may be connected to an LNA for reception, or to a power amplifier for transmission, or to a transmit/receive selector (e.g., similar to the transmit/receive selectors 130) for reception or transmission. The antenna ports may take any of a variety of physical forms such as connectors for connecting to another device, or transmission lines that may be connected to other devices, or pins of a chip that may be connected to transmission lines, etc. If the matrixes 1210, 1220 are for both reception and transmission, the beam direction device 1230 may include directional switches for reception and directional switches for transmission, with the reception and transmission switches selectively connecting to the beam ports of the matrixes 1210, 1220 depending upon whether signal reception or signal transmission is desired.

Referring to FIG. 13, with further reference to FIGS. 1-12, an antenna beam selecting method 1300 includes the stages shown. The method 1300 is, however, an example and not limiting. The method 1300 may be altered, e.g., by having stages added, removed, rearranged, combined, performed concurrently, and/or having single stages split into multiple stages.

At stage 1310, the method 1300 includes selecting one of a plurality of first beam ports of a first phase progression matrix having each antenna port of a first subset of a plurality of first antenna ports terminated in a respective first characteristic impedance, each of the plurality of first beam ports corresponding to one of a plurality of antenna beam directions. For example, the beam direction selection unit 550 selects a beam port of the beam production/selection device 526 of one partially-connected phase progression matrix, e.g., selecting a beam port of the matrix 1210 using the beam direction device 1230 (e.g., selecting a beam port of the matrix 640 using the BDS 660). Unused antenna ports are terminated in respective terminal impedances (with different terminal impedances possibly having different impedance values). The processor 510, possibly in combination with the memory 530, possibly in combination with the transceiver 520 (e.g., the beam production/selection device 526 such as the beam direction device 1230 and the matrix 1210, such as the BDS 660 and the matrix 640) may comprise means for selecting the first selected beam port.

At stage 1320, the method 1300 includes selecting one of a plurality of second beam ports of a second phase progression matrix that is separate from the first phase progression matrix having each antenna port of a second subset of a plurality of second antenna ports terminated in a respective second characteristic impedance, each of the plurality of second beam ports corresponding to one of the plurality of antenna beam directions. For example, the beam direction selection unit 550 selects a beam port of the beam production/selection device 526 of another partially-connected phase progression matrix, e.g., selecting a beam port of the matrix 1220 using the beam direction device 1230 (e.g., selecting a beam port of the matrix 650 using the BDS 670). Unused antenna ports are terminated in respective terminal impedances (with different terminal impedances possibly having different impedance values). The processor 510, possibly in combination with the memory 530, possibly in combination with the transceiver 520 (e.g., the beam production/selection device 526 such as the beam direction device 1230 and the matrix 1220, such as the BDS 670 and the matrix 650) may comprise means for selecting the second selected beam port.

At stage 1330, the method 1300 includes at least one of combining a first receive signal portion from the selected one of the plurality of first beam ports and a second receive signal portion from the selected one of the plurality of second beam ports, or providing a first portion of a transmit signal to the selected one of the plurality of first beam ports and a second portion of the transmit signal to the selected one of the plurality of second beam ports. For example, the beam production/selection device 526, e.g., the BDSs 660, 670 and the frequency conversion circuit 680, may combine signal portions received by the antenna elements 611-618 and provided to the selected beam ports of the matrixes 640, 650 and/or the beam production/selection device 526, e.g., the beam direction device 1230, may provide portions of a transmit signal to the selected beam ports of the matrixes 1210, 1220 and thus to the antenna elements connected to the antenna ports of the matrixes 1210, 1220 that are not connected to terminal impedances. The transceiver 520 (e.g., the beam production/selection device 526 and the frequency conversion circuit 528) possibly in combination with the processor 510 (possibly in combination with the memory 530) may comprise means for combining the first receive signal portion and the second receive signal portion and/or means for providing the first portion of the transmit signal to the first selected beam port and the second portion of the transmit signal to the second selected beam port.

Implementations of the method 1300 may include one or more of the following features. In an example implementation, the selected one of the plurality of first beam ports and the selected one of the plurality of second beam ports correspond to a same beam direction. A primary beam may be selected by selecting the same beam port of multiple partially-connected phase progression matrixes. In another example implementation, the selected one of the plurality of first beam ports corresponds to a first beam direction and the selected one of the plurality of second beam ports corresponds to a second beam direction that is different from the first beam direction. An intermediate beam may be selected by selecting different beam ports from different partially-connected phase progression matrixes.

Switch Core Configurations

Figure 14:
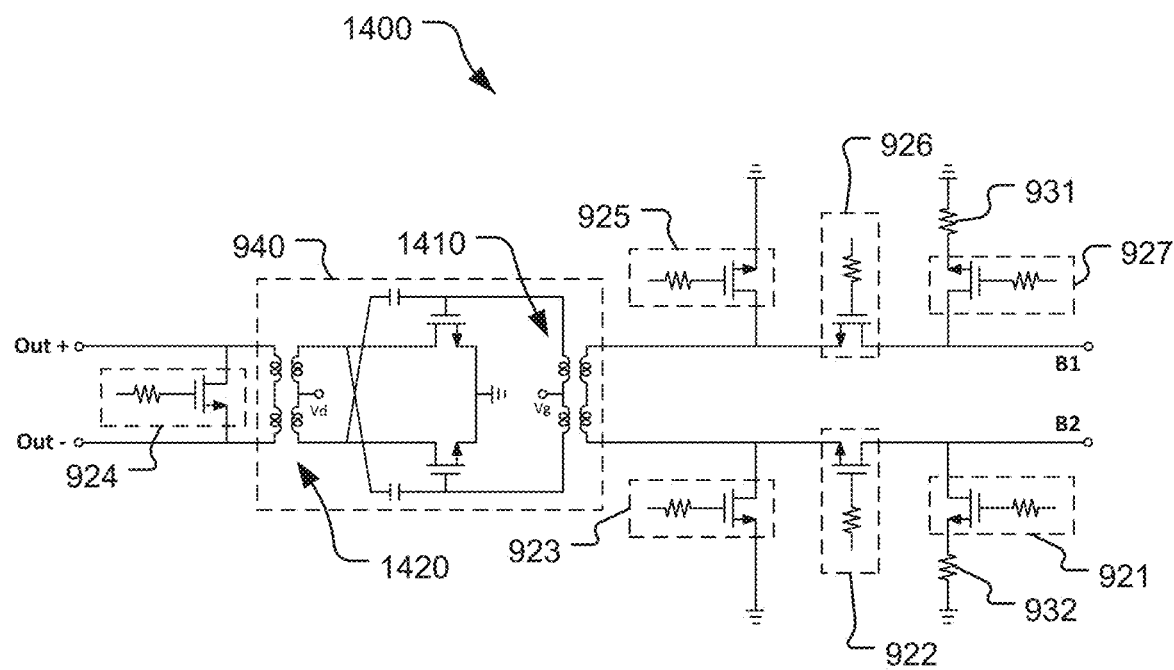
FIG. 14 is an example implementation of the switch core shown in FIG. 9.

Referring to FIG. 14, with further reference to FIG. 9, a switch core 1400 is an example of the switch core 900. The switch core 1400 implements each of the switches 921-927 with a respective FET (Field-Effect Transistor) with a resistor coupled to the respective gate. The amplifier 940 is configured as shown including transformers 1410, 1420. The switches 921-923 form a first pi (π) configuration and the switches 925-927 form a second pi configuration. In an ON condition of the first pi configuration, the switch 922 is closed (providing a small impedance) and the switches 921, 923 are open (providing large impedances). In an ON condition of the second pi configuration, the switch 926 is closed and the switches 925, 927 are open. In an OFF condition, the switch 922 (or 926) is open and the switches 921, 923 (or 925, 927) are closed. In the ON condition, either pi configuration provides low insertion loss (the impedance of the closed switch 922, 926), and in the OFF condition, a very low impedance (the closed impedance of the switch 923 or the switch 925) is provided to the transformer 1410 and a terminal impedance (the matched impedance 932 or the matched impedance 931) is provided to the other end of the switch core 1400 (e.g., connected to a phase progression matrix). The switch core 1400 provides a pi-configuration single pole single throw (SPST) switch, e.g., a pi-configuration SPST CMOS (Complementary Metal-Oxide Semiconductor) switch that provides different termination impedances in OFF conditions to opposite ports (here, opposite sides of the switches 922, 926) of pi-configurations of switches.

Figure 15:
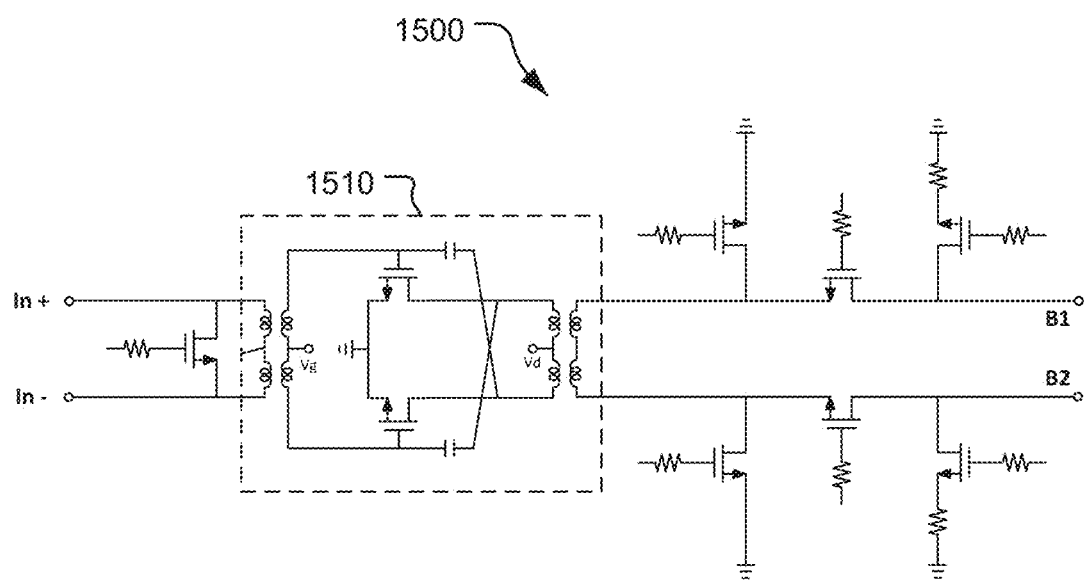
FIG. 15 is an example of a switch core, similar to the switch core shown in FIG. 14, for signal transmission.

Referring also to FIG. 15, while the switch core 1400 may be used for signal reception (e.g., from a phase progression matrix) a switch core 1500 may be used for signal transmission (e.g., to a phase progression matrix). The switch core 1500 is similar to the switch core 1400, but an amplifier 1510 is reversed relative to the amplifier 940. The switch core 1500, like the switch core 1400, includes two pi-configurations of three switches each, and provides a pi-configuration SPST switch, e.g., a pi-configuration SPST CMOS switch that provides different termination impedances in OFF conditions to opposite ports.

Implementation Examples

Implementation examples are provided in the following numbered clauses.

Clause 1. A system comprising:
a first phase progression matrix comprising first antenna ports, first beam ports, a plurality of first phase shifters, and a plurality of first quadrature hybrids, the first beam ports corresponding to a plurality of primary beam directions and a plurality of phase progressions for the first antenna ports, the first antenna ports comprising one or more first connectable antenna ports, each being configured to be communicatively coupled to a respective one of one or more first antenna elements, and the first antenna ports comprising one or more first unused antenna ports,
a second phase progression matrix comprising second antenna ports, second beam ports, a plurality of second phase shifters, and a plurality of second quadrature hybrids, the second beam ports corresponding to the plurality of primary beam directions and the plurality of phase progressions for the second antenna ports, the second antenna ports comprising one or more second connectable antenna ports, each being configured to be communicatively coupled to a respective one of one or more second antenna elements, and the second antenna ports comprising one or more second unused antenna ports; and
a beam direction device configured to communicatively couple a common port to a selected one of the first beam ports and a selected one of the second beam ports.

2. The system of clause 1, wherein the first antenna ports consist of N first antenna ports, with N being an even integer, the second antenna ports consist of N second antenna ports, the one or more first connectable antenna ports consist of N/2 first connectable antenna ports, and the one or more second connectable antenna ports consist of N/2 second connectable antenna ports.

3. The system of clause 2, further comprising a plurality of antenna elements comprising a first subset of antenna elements and a second subset of antenna elements, the first subset of antenna elements comprising the one or more first antenna elements and the second subset of antenna elements comprising the one or more second antenna elements, wherein the one or more first antenna elements and the one or more second antenna elements are disposed in a linear array, and wherein the one or more first antenna elements consists of N/2 consecutive first antenna elements and the one or more second antenna elements consists of N/2 consecutive second antenna elements.

4. The system of clause 2, wherein:
the first phase progression matrix is configured to provide a first plurality of linear phase progressions at the first antenna ports, each of the first plurality of linear phase progressions corresponding to one of the first beam ports;
the second phase progression matrix is configured to provide a second plurality of linear phase progressions at the second antenna ports similar to the first plurality of linear phase progressions at the first antenna ports, each of the second plurality of linear phase progressions corresponding to one of the second beam ports;
the N/2 first connectable antenna ports are N/2 consecutive ones of the first antenna ports corresponding to first phases; and
the N/2 second connectable antenna ports are N/2 consecutive ones of the second antenna ports corresponding to second phases that are different from the first phases.

5. The system of any of clauses 1-4, wherein the beam direction device is configured to communicatively couple the selected one of the first beam ports and the selected one of the second beam ports to the common port such that, with the selected one of the first beam ports corresponding to a first primary beam direction of the plurality of primary beam directions, the selected one of the second beam ports corresponds to a second primary beam direction that is the first primary beam direction or is adjacent to the first primary beam direction from among the plurality of primary beam directions.

6. The system of any of clauses 1-5, further comprising a plurality of antenna elements comprising the one or more first antenna elements and the one or more second antenna elements, wherein the plurality of phase progressions is a first plurality of phase progressions, the plurality of antenna elements are disposed in a two-dimensional array corresponding to a first dimension and a second dimension, the first phase progression matrix and the second phase progression matrix are configured to provide the first plurality of phase progressions in the first dimension, and wherein the system comprises at least one phase shifter configured to provide a second plurality of phase progressions to the plurality of antenna elements in the second dimension.

7. The system of any of clauses 1-6, wherein each of the one or more first unused antenna ports and each of the one or more second unused antenna ports is coupled to a terminal impedance.

8. The system of any of clauses 1-7, wherein each of the first beam ports other than the selected one of the first beam ports and each of the second beam ports other than the selected one of the second beam ports is coupled to a terminal impedance.

9. The system of any of clauses 1-8, further comprising a power combiner communicatively coupled to the first phase progression matrix and the second phase progression matrix and configured to combine a first signal from the first phase progression matrix and a second signal from the second phase progression matrix.

10. The system of any of clauses 1-9, further comprising:
a first mixer communicatively coupled to the first phase progression matrix and configured to mix a first signal from a local oscillator with a second signal from the first phase progression matrix or configured to mix the first signal with a fourth signal to produce a fifth signal to be provided to the first phase progression matrix; and
a second mixer communicatively coupled to the second phase progression matrix and configured to mix the first signal from the local oscillator with a sixth signal from the second phase progression matrix or configured to mix the first signal with a seventh signal to produce an eighth signal to be provided to the second phase progression matrix.

11. The system of clause 10, further comprising:
a first amplifier communicatively coupled to the first phase progression matrix and the first mixer and configured to amplify the second signal; and
a second amplifier communicatively coupled to the second phase progression matrix and the second mixer and configured to amplify the sixth signal.

12. The system of any of clauses 1-11, further comprising a plurality of transmit/receive circuits each communicatively coupled to a respective one of the first antenna ports or a respective one of the second antenna ports.

13. An antenna beam selecting method comprising:
selecting one of a plurality of first beam ports of a first phase progression matrix having each antenna port of a first subset of a plurality of first antenna ports terminated in a respective first characteristic impedance, each of the plurality of first beam ports corresponding to one of a plurality of antenna beam directions;
selecting one of a plurality of second beam ports of a second phase progression matrix that is separate from the first phase progression matrix having each antenna port of a second subset of a plurality of second antenna ports terminated in a respective second characteristic impedance, each of the plurality of second beam ports corresponding to one of the plurality of antenna beam directions; and
at least one of: combining a first receive signal portion from the selected one of the plurality of first beam ports and a second receive signal portion from the selected one of the plurality of second beam ports, or providing a first portion of a transmit signal to the selected one of the plurality of first beam ports and a second portion of the transmit signal to the selected one of the plurality of second beam ports.

14. The antenna beam selecting method of clause 13, wherein the selected one of the plurality of first beam ports and the selected one of the plurality of second beam ports correspond to a same beam direction.

15. The antenna beam selecting method of clause 13, wherein the selected one of the plurality of first beam ports corresponds to a first beam direction and the selected one of the plurality of second beam ports corresponds to a second beam direction that is different from the first beam direction.

16. An antenna beam selection system comprising:
means for selecting one of a plurality of first beam ports of a first phase progression matrix having each antenna port of a first subset of a plurality of first antenna ports terminated in a respective first characteristic impedance, each of the plurality of first beam ports corresponding to one of a plurality of beam directions;
means for selecting one of a plurality of second beam ports of a second phase progression matrix that is separate from the first phase progression matrix having each antenna port of a second subset of a plurality of second antenna ports terminated in a respective second characteristic impedance, each of the plurality of second beam ports corresponding to one of the plurality of beam directions; and
at least one of:
means for combining a first receive signal portion from the selected one of the plurality of first beam ports and a second receive signal portion from the selected one of the plurality of second beam ports; and
means for providing a first portion of a transmit signal to the selected one of the plurality of first beam ports and a second portion of the transmit signal to the selected one of the plurality of second beam ports.

17. The antenna beam selection system of clause 16, wherein the selected one of the plurality of first beam ports and the selected one of the plurality of second beam ports correspond to a same beam direction.

18. The antenna beam selection system of clause 16, wherein the selected one of the plurality of first beam ports corresponds to a first beam direction and the selected one of the plurality of second beam ports corresponds to a second beam direction that is different from the first beam direction.

19. The antenna beam selection system of any of clauses 16-18, wherein the plurality of first antenna ports consists of N first antenna ports, the plurality of second antenna ports consists of N second antenna ports, the first subset of the plurality of first antenna ports consists of half of the N first antenna ports, and the second subset of the plurality of second antenna ports consists of half of the N second antenna ports.

20. The antenna beam selection system of any of clauses 16-19, wherein the means for selecting the one of the plurality of first beam ports of the first phase progression matrix and the means for selecting the one of the plurality of second beam ports of the second phase progression matrix comprise:
a first set of beam port selection means;
a second set of beam port selection means; and
means for applying different phases corresponding to the first set of beam port selection means and the second set of beam port selection means.

Other Considerations

Other examples and implementations are within the scope of the disclosure and appended claims. For example, configurations other than those shown may be used. Also, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C." or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A. or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device." or similar term, does not require that the functionality of the device is exclusively, or evenly primarily, for communication, or that communication using the wireless communication device is exclusively, or evenly primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A system comprising:
a first phase progression matrix comprising first antenna ports, first beam ports, a plurality of first phase shifters, and a plurality of first quadrature hybrids, the first beam ports corresponding to a plurality of primary beam directions and a plurality of phase progressions for the first antenna ports, the first antenna ports comprising one or more first connectable antenna ports, each being configured to be communicatively coupled to a respective one of one or more first antenna elements, and the first antenna ports comprising one or more first unused antenna ports;
a second phase progression matrix comprising second antenna ports, second beam ports, a plurality of second phase shifters, and a plurality of second quadrature hybrids, the second beam ports corresponding to the plurality of primary beam directions and the plurality of phase progressions for the second antenna ports, the second antenna ports comprising one or more second connectable antenna ports, each being configured to be communicatively coupled to a respective one of one or more second antenna elements, and the second antenna ports comprising one or more second unused antenna ports; and
a beam direction device configured to communicatively couple a common port to a selected one of the first beam ports and a selected one of the second beam ports.

2. The system of claim 1, wherein the first antenna ports consist of N first antenna ports, with N being an even integer, the second antenna ports consist of N second antenna ports, the one or more first connectable antenna ports consist of N/2 first connectable antenna ports, and the one or more second connectable antenna ports consist of N/2 second connectable antenna ports.

3. The system of claim 2, further comprising a plurality of antenna elements comprising a first subset of antenna elements and a second subset of antenna elements, the first subset of antenna elements comprising the one or more first antenna elements and the second subset of antenna elements comprising the one or more second antenna elements, wherein the one or more first antenna elements and the one or more second antenna elements are disposed in a linear array, and wherein the one or more first antenna elements consists of N/2 consecutive first antenna elements and the one or more second antenna elements consists of N/2 consecutive second antenna elements.

4. The system of claim 2, wherein:
the first phase progression matrix is configured to provide a first plurality of linear phase progressions at the first antenna ports, each of the first plurality of linear phase progressions corresponding to one of the first beam ports;
the second phase progression matrix is configured to provide a second plurality of linear phase progressions at the second antenna ports similar to the first plurality of linear phase progressions at the first antenna ports, each of the second plurality of linear phase progressions corresponding to one of the second beam ports;
the N/2 first connectable antenna ports are N/2 consecutive ones of the first antenna ports corresponding to first phases; and
the N/2 second connectable antenna ports are N/2 consecutive ones of the second antenna ports corresponding to second phases that are different from the first phases.

5. The system of claim 1, wherein the beam direction device is configured to communicatively couple the selected one of the first beam ports and the selected one of the second beam ports to the common port such that, with the selected one of the first beam ports corresponding to a first primary beam direction of the plurality of primary beam directions, the selected one of the second beam ports corresponds to a second primary beam direction that is the first primary beam direction or is adjacent to the first primary beam direction from among the plurality of primary beam directions.

6. The system of claim 1, further comprising a plurality of antenna elements comprising the one or more first antenna elements and the one or more second antenna elements, wherein the plurality of phase progressions is a first plurality of phase progressions, the plurality of antenna elements are disposed in a two-dimensional array corresponding to a first dimension and a second dimension, the first phase progression matrix and the second phase progression matrix are configured to provide the first plurality of phase progressions in the first dimension, and wherein the system comprises at least one phase shifter configured to provide a second plurality of phase progressions to the plurality of antenna elements in the second dimension.

7. The system of claim 1, wherein each of the one or more first unused antenna ports and each of the one or more second unused antenna ports is coupled to a terminal impedance.

8. The system of claim 1, wherein each of the first beam ports other than the selected one of the first beam ports and each of the second beam ports other than the selected one of the second beam ports is coupled to a terminal impedance.

9. The system of claim 1, further comprising a power combiner communicatively coupled to the first phase progression matrix and the second phase progression matrix and configured to combine a first signal from the first phase progression matrix and a second signal from the second phase progression matrix.

10. The system of claim 1, further comprising:
a first mixer communicatively coupled to the first phase progression matrix and configured to mix a first signal from a local oscillator with a second signal from the first phase progression matrix or configured to mix the first signal with a fourth signal to produce a fifth signal to be provided to the first phase progression matrix; and
a second mixer communicatively coupled to the second phase progression matrix and configured to mix the first signal from the local oscillator with a sixth signal from the second phase progression matrix or configured to mix the first signal with a seventh signal to produce an eighth signal to be provided to the second phase progression matrix.

11. The system of claim 10, further comprising:
a first amplifier communicatively coupled to the first phase progression matrix and the first mixer and configured to amplify the second signal; and
a second amplifier communicatively coupled to the second phase progression matrix and the second mixer and configured to amplify the sixth signal.

12. The system of claim 1, further comprising a plurality of transmit/receive circuits each communicatively coupled to a respective one of the first antenna ports or a respective one of the second antenna ports.

13. An antenna beam selecting method comprising:
selecting one of a plurality of first beam ports of a first phase progression matrix having each antenna port of a first subset of a plurality of first antenna ports terminated in a respective first characteristic impedance, each of the plurality of first beam ports corresponding to one of a plurality of antenna beam directions;

selecting one of a plurality of second beam ports of a second phase progression matrix that is separate from the first phase progression matrix having each antenna port of a second subset of a plurality of second antenna ports terminated in a respective second characteristic impedance, each of the plurality of second beam ports corresponding to one of the plurality of antenna beam directions; and at least one of: combining a first receive signal portion from the selected one of the plurality of first beam ports and a second receive signal portion from the selected one of the plurality of second beam ports, or providing a first portion of a transmit signal to the selected one of the plurality of first beam ports and a second portion of the transmit signal to the selected one of the plurality of second beam ports.

14. The antenna beam selecting method of claim 13, wherein the selected one of the plurality of first beam ports and the selected one of the plurality of second beam ports correspond to a same beam direction.

15. The antenna beam selecting method of claim 13, wherein the selected one of the plurality of first beam ports corresponds to a first beam direction and the selected one of the plurality of second beam ports corresponds to a second beam direction that is different from the first beam direction.

16. An antenna beam selection system comprising:

means for selecting one of a plurality of first beam ports of a first phase progression matrix having each antenna port of a first subset of a plurality of first antenna ports terminated in a respective first characteristic impedance, each of the plurality of first beam ports corresponding to one of a plurality of beam directions;

means for selecting one of a plurality of second beam ports of a second phase progression matrix that is separate from the first phase progression matrix having each antenna port of a second subset of a plurality of second antenna ports terminated in a respective second characteristic impedance, each of the plurality of second beam ports corresponding to one of the plurality of beam directions; and at least one of:

means for combining a first receive signal portion from the selected one of the plurality of first beam ports and a second receive signal portion from the selected one of the plurality of second beam ports; and means for providing a first portion of a transmit signal to the selected one of the plurality of first beam ports and a second portion of the transmit signal to the selected one of the plurality of second beam ports.

17. The antenna beam selection system of claim 16, wherein the selected one of the plurality of first beam ports and the selected one of the plurality of second beam ports correspond to a same beam direction.

18. The antenna beam selection system of claim 16, wherein the selected one of the plurality of first beam ports corresponds to a first beam direction and the selected one of the plurality of second beam ports corresponds to a second beam direction that is different from the first beam direction.

19. The antenna beam selection system of claim 16, wherein the plurality of first antenna ports consists of N first antenna ports, the plurality of second antenna ports consists of N second antenna ports, the first subset of the plurality of first antenna ports consists of half of the N first antenna ports, and the second subset of the plurality of second antenna ports consists of half of the N second antenna ports.

20. The antenna beam selection system of claim 16, wherein the means for selecting the one of the plurality of first beam ports of the first phase progression matrix and the means for selecting the one of the plurality of second beam ports of the second phase progression matrix comprise:

a first set of beam port selection means;

a second set of beam port selection means; and means for applying different phases corresponding to the first set of beam port selection means and the second set of beam port selection means.

\* \* \* \* \*